US012724767B2

(12) United States Patent
Rokka Chhetri et al.

(10) Patent No.: US 12,724,767 B2
(45) Date of Patent: Sep. 1, 2026

(54) AUTOMATED GENERATION OF PAIRS OF NATURAL LANGUAGE QUESTIONS AND DATABASE QUERIES

(71) Applicant: Palo Alto Networks, Inc., Santa Clara, CA (US)

(72) Inventors: Sujit Rokka Chhetri, San Jose, CA (US); William Redington Hewlett, II, Mountain View, CA (US); Sheng Yang, Santa Clara, CA (US); Gaurav Mitesh Dalal, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/786,298

(22) Filed: Jul. 26, 2024

(65) Prior Publication Data

US 2026/0030241 A1 Jan. 29, 2026

(51) Int. Cl.
*G06F 7/00* (2006.01)
*G06F 16/242* (2019.01)
*G06F 21/62* (2013.01)

(52) U.S. Cl.
CPC ........ *G06F 16/243* (2019.01); *G06F 21/6254* (2013.01)

(58) Field of Classification Search
CPC ............... G06F 16/243; G06F 21/6254; G06F 16/24522; G06F 16/3329; G06F 16/90332
See application file for complete search history.

(56) References Cited

U.S. PATENT DOCUMENTS

| | | | | |
|---|---|---|---|---|
| 5,584,024 | A * | 12/1996 | Shwartz | G06F 16/243 704/7 |
| 7,350,191 | B1 * | 3/2008 | Kompella | G06F 9/44505 707/999.005 |
| 10,303,683 | B2 * | 5/2019 | Anderson | G06F 16/285 |
| 10,558,688 | B1 * | 2/2020 | Nguyen | G06F 16/3344 |
| 11,861,321 | B1 * | 1/2024 | O'Kelly | G06F 16/33 |
| 11,972,223 | B1 * | 4/2024 | DeFoor | G06N 20/00 |
| 12,105,746 | B1 * | 10/2024 | Wu | G06F 16/3329 |

(Continued)

OTHER PUBLICATIONS

Timbadia, et al., "Conversion of SQL Query to Natural Language", International Research Journal of Engineering and Technology (IRJET), vol. 8, Iss. 2, Feb. 2021, 4 pages.

*Primary Examiner* — Mohammed R Uddin
(74) *Attorney, Agent, or Firm* — Gilliam IP PLLC

(57) ABSTRACT

A pipeline performs automated generation of database queries for a database and corresponding questions comprising natural language text. The pipeline generates database query templates based at least partly on a schema of the database and populates the query templates based on values identified from the records sampled from the database to generate valid database queries. The pipeline then generates abstract representations of each of the generated database queries and, for each abstracted database query, prompts a language model to generate a corresponding question in natural language. The pipeline prompts another language model to evaluate similarity of each abstracted database query and corresponding natural language question. The natural language questions and database queries associated with the corresponding abstractions that are sufficiently similar are provided for use.

20 Claims, 9 Drawing Sheets

(56) References Cited

U.S. PATENT DOCUMENTS 12,135,740 B1 * 11/2024 Yu ........................ G06F 16/3329
12,223,080 B1 * 2/2025 Al-Rikabi ............. G06F 16/243
2005/0086046 A1 * 4/2005 Bennett ............. G06F 16/24522
704/E15.04
2010/0281355 A1 * 11/2010 White .................... G06Q 30/02
715/224
2016/0070708 A1 * 3/2016 Labbi .................... G06F 16/248
707/723
2016/0171050 A1 * 6/2016 Das ................... G06F 16/90332
707/718
2017/0132199 A1 * 5/2017 Vescovi ............... G06Q 10/101
2017/0213246 A1 * 7/2017 Shahan .............. G06Q 30/0277
2018/0285439 A1 * 10/2018 Li ....................... G06F 16/2453
2019/0012371 A1 * 1/2019 Campbell ........... G06F 16/3329
2019/0034540 A1 * 1/2019 Perkins ............... G06F 16/9535
2020/0334233 A1 * 10/2020 Lee ....................... G06F 16/243
2021/0019309 A1 * 1/2021 Yadav ................... G06F 16/248
2021/0133557 A1 * 5/2021 Iyoob .................... G06F 40/205
2022/0078797 A1 * 3/2022 Helms ....................... G06F 3/02
2023/0034344 A1 * 2/2023 Jain .......................... G06N 3/04
2023/0135179 A1 * 5/2023 Mielke ................... G06N 5/022
704/232
2023/0186161 A1 * 6/2023 Arthur .................... G06F 40/58
704/2
2023/0315856 A1 * 10/2023 Lee .......................... G06N 3/08
2024/0061833 A1 * 2/2024 Tangari ................. G06F 40/253
2024/0144676 A1 * 5/2024 Arroyo .................. G06V 10/82
2024/0160646 A1 * 5/2024 Liu ..................... G06F 16/3329
2024/0202464 A1 * 6/2024 Poirier ................... G06N 20/00
2024/0362497 A1 * 10/2024 Grenader ............. G06N 3/0455
2024/0378198 A1 * 11/2024 Latendresse ........ G06F 16/2425
2024/0394251 A1 * 11/2024 Brende ............... G06F 11/3409
2024/0394287 A1 * 11/2024 Li ....................... G06F 16/3332
2024/0404514 A1 * 12/2024 Rollwage ............. A61B 5/4803
2024/0428017 A1 * 12/2024 Shoham ................ G06F 16/243
2025/0005290 A1 * 1/2025 Qiu ......................... G06F 40/30
2025/0007870 A1 * 1/2025 Kim ........................ G06F 21/31
2025/0021767 A1 * 1/2025 Dharnidharka ... G06F 16/90332
2025/0094171 A1 * 3/2025 Isaacson ............. G06F 9/30079
2025/0110934 A1 * 4/2025 Dibia ...................... G10L 15/16
2025/0110948 A1 * 4/2025 Nguyen ................ G06F 16/283
2025/0111267 A1 * 4/2025 Huang .................... G06F 40/30
2025/0124060 A1 * 4/2025 Hackman ............ G06F 16/3329
2025/0140254 A1 * 5/2025 Lefkofsky .............. G16H 50/20
2025/0147956 A1 * 5/2025 Payani ................ G06F 16/2433
2025/0148219 A1 * 5/2025 Jauhar ...................... G06N 5/02
2025/0156413 A1 * 5/2025 Barkan ............. G06F 16/24522

* cited by examiner

AUTOMATED GENERATION OF PAIRS OF NATURAL LANGUAGE QUESTIONS AND DATABASE QUERIES

BACKGROUND

The disclosure generally relates to data processing (e.g., CPC subclass G06F) and to computing arrangements based on specific computational models (e.g., CPC subclass G06N).

The Stanford Institute for Human-Centered Artificial Intelligence created an interdisciplinary initiative named the Center for Research on Foundation Models. They coined the term "foundation models" to refer to machine learning models "trained on broad data at scale such that they can be adapted to a wide range of downstream tasks." Some models considered foundation models include BERT, GPT-4, Codex, and LLaMA. Foundation models are based on artificial neural networks including generative adversarial networks (GANs), transformers, and variational encoders.

Multiple applications of foundation models in the field of natural language processing, particularly in the case of language models such as large language models (LLMs), have been realized. One such application is the use of language models for text-to-Structured Query Language (SQL) conversion. Text-to-SQL conversion refers to generating SQL queries representative of natural language text indicated in prompts. Language models used for text-to-SQL conversion can be pre-trained models adapted for this task with various techniques, such as prompt tuning, fine-tuning, or with one- or few-shot prompting using prompts engineered for the task of generating database queries from natural language text.

BRIEF DESCRIPTION OF THE DRAWINGS

Embodiments of the disclosure may be better understood by referencing the accompanying drawings.

DESCRIPTION

Figure 1:
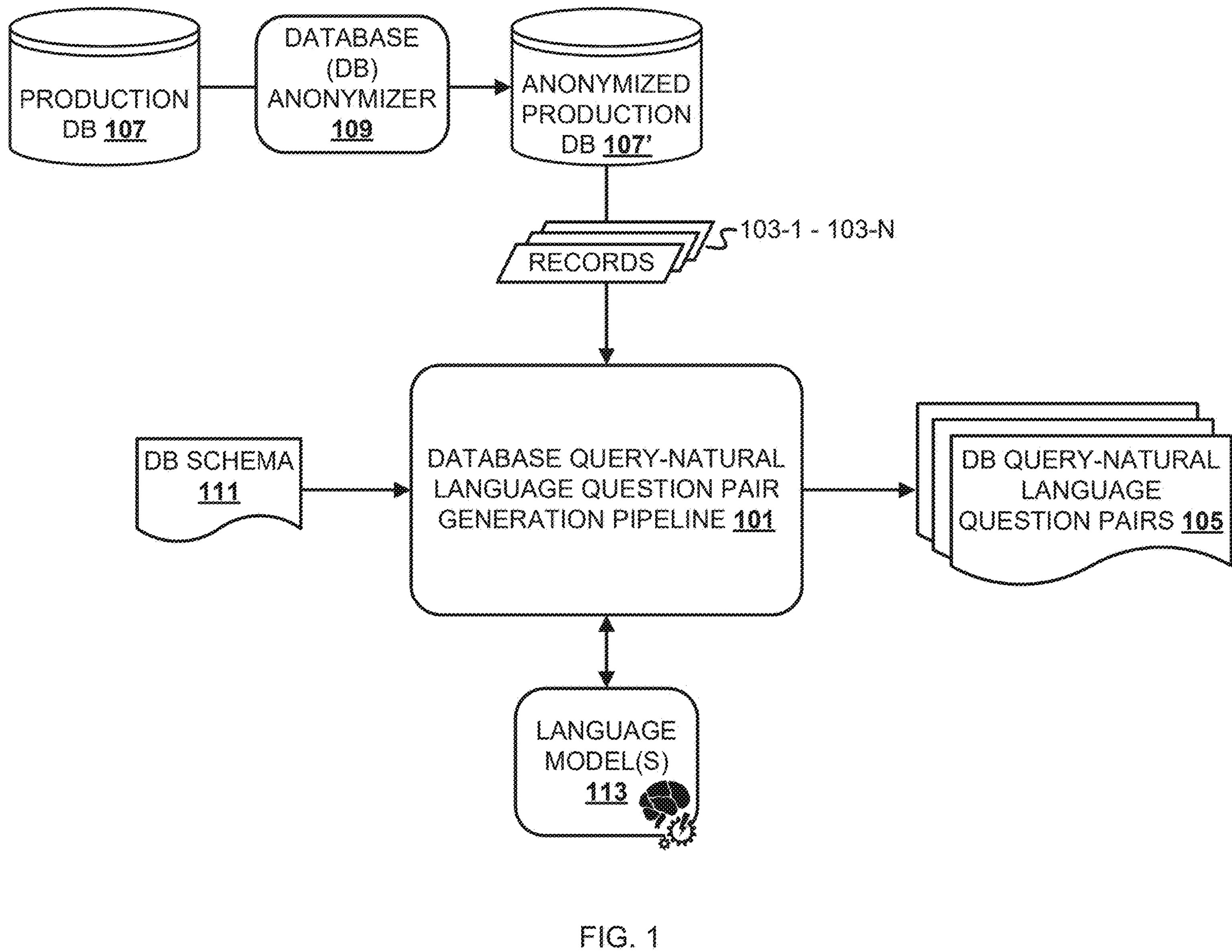
FIG. 1 depicts a conceptual diagram of generating pairs of natural language questions and database queries for an anonymized production database.

The description that follows includes example systems, methods, techniques, and program flows to aid in understanding the disclosure and not to limit claim scope. Well-known instruction instances, protocols, structures, and techniques have not been shown in detail for conciseness.

Terminology

A "prompt" refers to input to a foundation model, and prompting refers to the act of submitting a prompt to a model to perform inference based on the submitted prompt. A prompt at least includes a natural language task instruction to the model. A prompt can also include context, constraints, and examples. In other words, a prompt is a natural language task instruction and other information that can assist the model in performing the task successfully. A prompt can have more than one task instruction and prompts can be chained to incorporate responses from the model into a subsequent prompt. A prompt can be entered by a user and/or constructed from a prompt template.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Introduction

Organizations can deploy chatbot systems that act as an interface between users and databases of the organization, such as databases that maintain proprietary data and/or data collected from the users. These chatbot systems often leverage text-to-SQL (or other database query languages) capabilities of foundation models (e.g., LLMs) to generate database queries representative of queries comprising natural language text provided as input by users. Chatbot systems that orchestrate text-to-SQL conversion with a language model or other foundation model can improve accessibility of customer information maintained in the organization's database to customers, as customers need not know the specific database query language or schema of the database to access the information contained therein. Instead, customers are able to search for information with questions comprising natural language text input to a chatbot that interfaces with a foundation model for conversion of those questions to database queries that are ultimately executed against the database.

Overview

Quantities of valid pairs of questions comprising natural language text (hereinafter "natural language questions") that represent example user queries and their corresponding database queries that are available to an organization for the task of adapting foundation models to convert user queries to representative database queries (e.g., with few-shot prompting) may be limited. Additionally, generating pairs comprising example user queries that comprise natural language questions and their corresponding database queries can be costly in terms of resources consumed, whether in terms of manual labor or in terms of computing resources that are utilized.

Disclosed herein are techniques for automated generation of valid pairs of natural language questions and database queries based on a production database of an organization with minimized cost. A database query-natural language question pair generation pipeline (hereinafter simply "the pipeline") generates database query templates (e.g., SQL templates) based at least partly on a schema of the production database with which the database queries should be compatible for execution. The pipeline populates the database query templates based on values identified from the subset of records sampled from the production database to generate a plurality of database queries and validates the generated database queries to ensure syntactic correctness and executability. The resulting database queries are valid based on the known information about the database (i.e., the schema and possible values of various database fields represented in the query templates). The pipeline then generates higher-level representations of each of the generated database queries that are closer to natural language than the database query syntax and, for each abstracted database query, prompts a language model (e.g., an LLM) to generate a question in natural language corresponding to the abstracted database query. The database queries are abstracted before being fed to the language model in prompts to prevent the language model from simply describing the database query on a syntactic level due to identifying the presence of database query language-specific syntactic elements. The pipeline then prompts another language model to evaluate similarity of each of the pairs of abstracted database queries and natural language questions (e.g., with chain-of-thought prompting). Those that differ are filtered out, and each of the natural language questions that is sufficiently similar to its corresponding abstracted database query are paired with the original database query and provided for use.

Since production databases for which database queries are to be generated may include personally identifiable information (PII), the database can also be anonymized before the records are sampled therefrom for database query generation. A database anonymizer is configured with indications of fields of the database that include PII. For each of these fields, the database anonymizer maps each distinct value originally included therein to a generated value that is unique with respect to the set of values for that field. The database anonymizer replaces occurrences of each of these original values in the database with the respective generated value. The mappings are then deleted so the mapping of distinct values comprising PII to their replacement values is one-way. The "anonymized database" that has had PII replaced with the generated values is then used for database query generation such that the records sampled from the database have had any PII removed, so the sensitive information thus is not included in the database queries that the pipeline generates.

Example Illustrations

Figure 2:
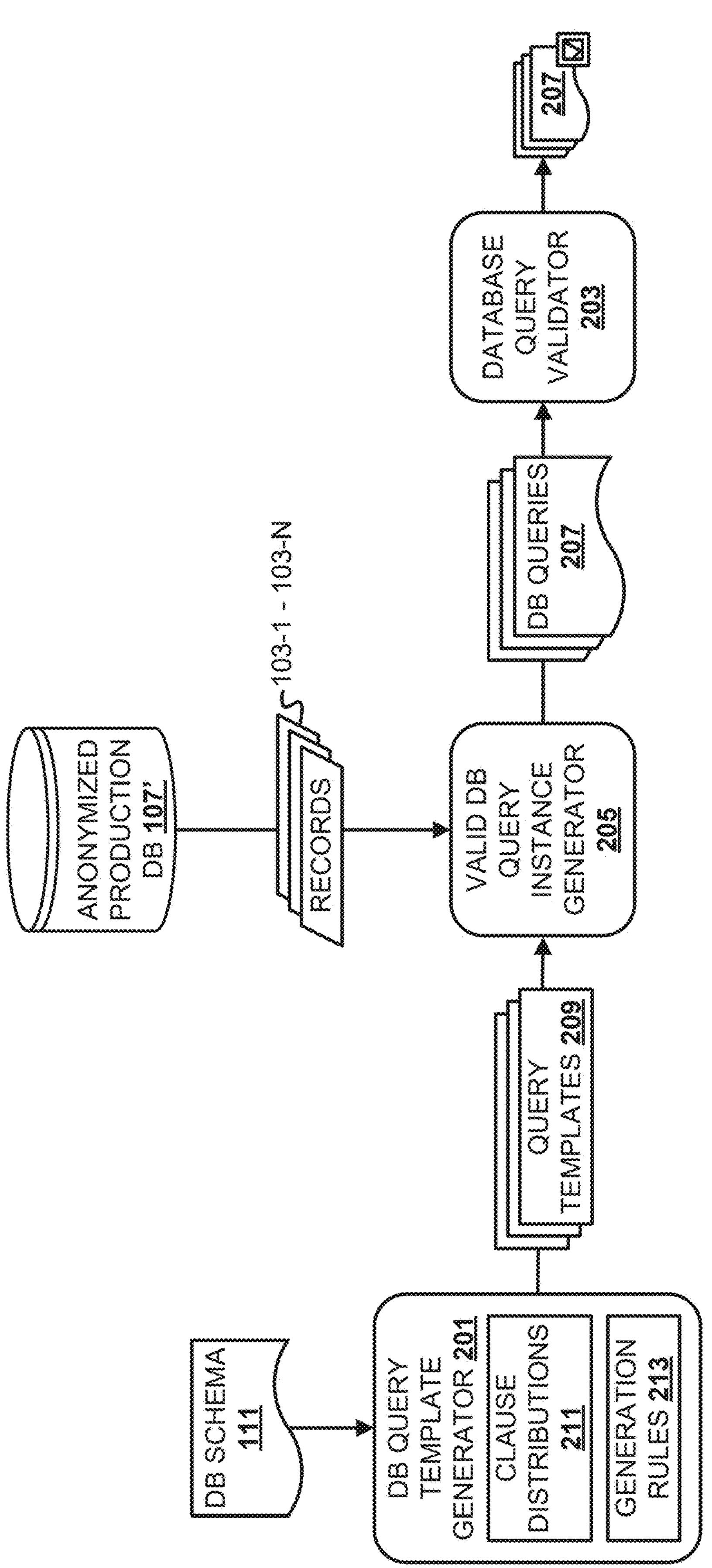
FIG. 2 is a conceptual diagram of generating database queries that are compatible with a database based on generated query templates and a subset of records obtained from the database.
Figure 3:
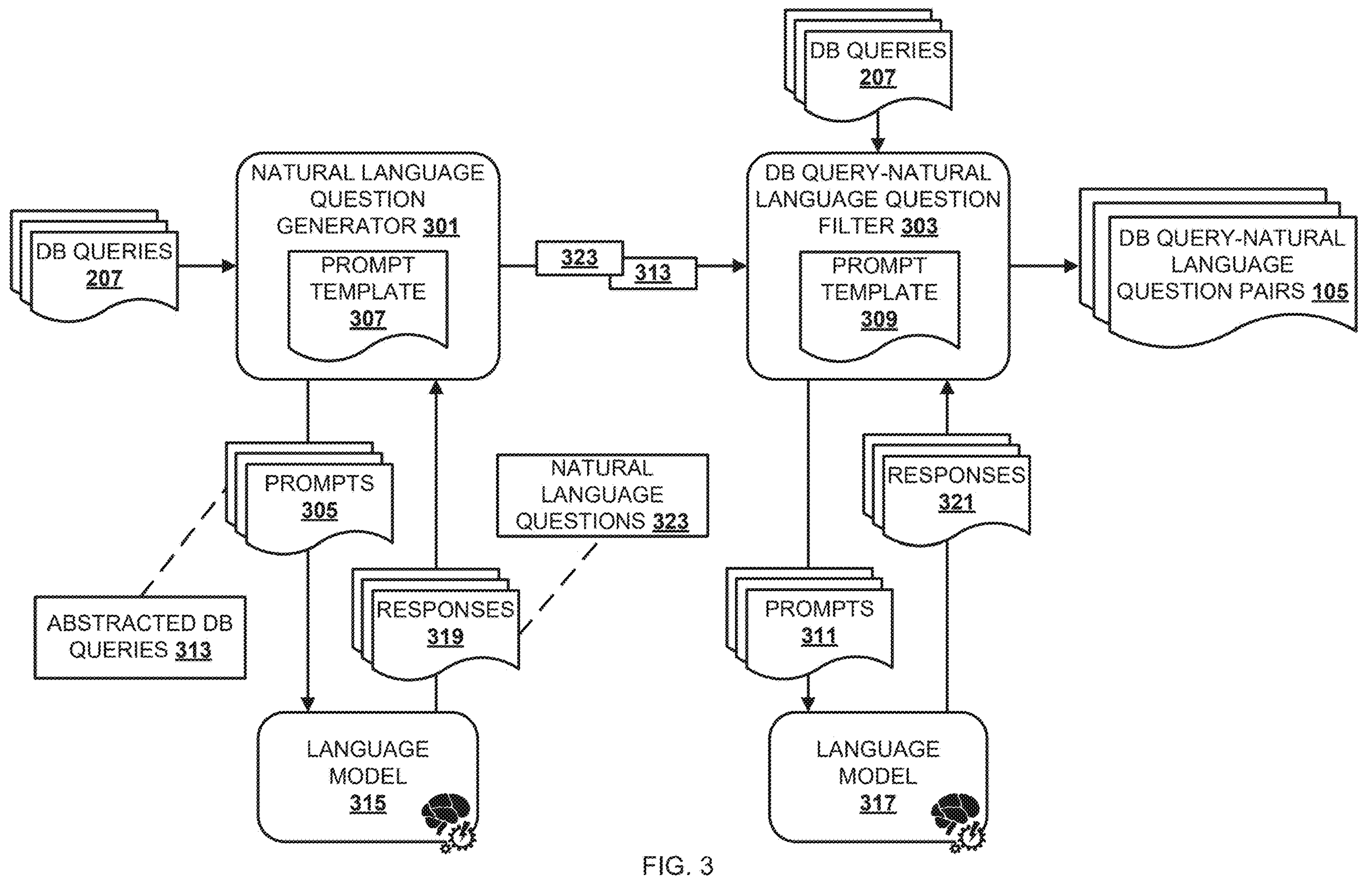
FIG. 3 is a conceptual diagram of generating natural language questions from generated database queries.

FIG. 1 depicts a conceptual diagram of generating pairs of natural language questions and database queries for an anonymized production database. A database query-natural language question pair generation pipeline ("the pipeline") 101 generates pairs 105 of natural language questions and corresponding database queries that are executable against a production database ("the database") 107. The database 107 may be a relational database that can be accessed via a database query language, such as SQL. SQL is given as an example database query language herein in reference to generating database query-natural language question pairs to aid in illustration, though implementations can be applicable to other database query languages. FIG. 1 depicts the pipeline 101 at a high level to aid in understanding. FIGS. 2 and 3 depict aspects of generation of the pairs 105 of natural language questions and corresponding database queries by the pipeline 101 in greater detail.

A database anonymizer 109 has anonymized the database 107 to yield an anonymized version of the database, depicted as anonymized production database ("the anonymized database") 107'. To anonymize the database 107, the database anonymizer 109 identifies fields of the database 107 that comprise PII. The database anonymizer 109 has been configured with indications of these fields, and these fields have been previously determined (e.g., based on expert knowledge). For each distinct value in a respective one of these fields, the database anonymizer 109 generates a realistic-appearing but randomly generated replacement for the distinct value. Generation of the replacement value can depend on the type of the PII. For instance, for fields that contain Internet Protocol (IP) addresses as values, the database anonymizer 109 can utilize random number generation to populate an IP address pattern with randomly generated numbers or replace each IP address with an IP address allocated from a pool of IP addresses typically reserved for documentation (i.e., 192.0.2.0/24, 198.51.100.0/24, and/or 203.0.113.0/24). As another example, for fields that contain email addresses, the database anonymizer 109 can generate random strings and populate an email address pattern with the randomly generated strings. The generated replacement values should be unique with respect to other values in the field such that uniqueness of values within a column is preserved. To illustrate, if a field comprises 20 rows with 17 distinct values, the anonymized version of that field would still comprise 20 rows with 17 distinct values. The mapping of each original value of the database 107 to its corresponding replacement in the anonymized database 107' is deleted so the mappings are one-way.

The pipeline 101 generates the pairs 105 of database queries and natural language questions based partly on a schema 111 of the database 107 and a subset of records 103A-N obtained from the anonymized database 107. The pipeline 101 has been preconfigured with a number N of records that should be randomly sampled from the anonymized database 107. N may be a whole number or may be represented as a proportion (e.g., a fraction, percentage, etc.) of records in the anonymized database 107. The pipeline 101 obtains these N records, the records 103-1 to 103N, from selection of a random N records from the anonymized database 107.

The pipeline 101 also interfaces with one or more language models 113. The language model(s) 113 can be an LLM(s) accessible to the pipeline 101 via an application programming interface (API). FIG. 1 depicts the language model(s) 113 as comprising one language model for simplicity and to aid in illustration, though implementations can interface with multiple language models. "The language model(s) 113" can thus encompass multiple different language models, multiple instances of a sample language model, etc.

FIG. 2 is a conceptual diagram of generating database queries that are compatible with a database based on generated query templates and a subset of records obtained from the database. FIG. 2 depicts several components of the pipeline 101 of FIG. 1: a database query template generator ("template generator") 201, a database query validator 203, and a valid database query instance generator ("query generator") 205.

The template generator 201 generates query templates 209 based at least partly on the schema 111 of the database 107. The schema 111 can be represented as a data structure(s), as contents of a file(s), or another technique for database schema modeling. The query templates 209 are templates for database queries written in the query language used with the database 107 (e.g., SQL templates). The query templates 209 include parameters or other placeholders in the place of values for the fields of the database 107 indicated in the schema 111. The template generator 201 is also configured with clause distributions 211 that inform template generation. The clause distributions 211 indicate a distribution of average or expected occurrences of clauses in the database query language so that generated database queries are reflective of average or expected user behavior. For instance, the clause distributions 211 can indicate proportions with which clauses should occur across generated database queries, a statistic (e.g., probability) indicating incidence of clauses occurring together in a same database query, etc. The template generator 201 is further configured with generation rules 213 that indicate rules that guide template generation. The generation rules 213 may have been previously defined based on expert/domain knowledge for reducing generation of templates that may appear valid but will not result in generating a meaningful database query. As an example, one of the generation rules 213 can indicate two or more fields of the database 107 that should not be included in a same query template due to being unrelated despite being valid database fields. As another example, the generation rules 213 can also indicate rules for clauses, such as which clauses can come before other clauses, invalid sequences of clauses, etc. The query templates 209 are randomly generated based on the schema 111 and the clause distributions 211 and generation rules 213.

The query generator 205 generates database queries based on the query templates 209 and the records 103-1 to 103-N sampled from the anonymized database 107'. The query generator 205 populates the query templates 209 with values identified from the records 103-1 to 103-N to generate database queries 207. Each of the database queries 207 should be executable to produce a non-empty set of results because the database query was generated based on data stored in the anonymized database 107'. The query generator 205 can generate a designated number of database queries based on populating the query templates 209. For instance, the query generator 205 can generate M database query instances from each of the database query templates 209 by populating each database query template with values identified from M randomly selected ones of the records 103-1 to 103-N.

A database query validator 203 validates the database queries 207 to ensure syntactic correctness and executability. The database query validator 203 performs a syntax check for the database queries 207 before they are passed for generation of natural language questions (described below in reference to FIG. 3). To illustrate, the database query validator 203 can perform a dry run of the database queries 207 to ensure they are executable and syntactically correct. Those that contain syntax errors can then be discarded or otherwise omitted from subsequent operations. The validated subset of the database queries 207 are then made available for generation of corresponding natural language questions.

FIG. 3 is a conceptual diagram of generating natural language questions from generated database queries. FIG. 3 depicts a natural language question generator ("question generator") 301 and a database query-natural language question filter ("filter") 303. The question generator 301 interfaces with a language model 315, and the filter 303 interfaces with a language model 317. The language models 315, 317 can be LLMs that the question generator 301 and the filter 303 respectively communicate with for submission of prompts via APIs of the LLMs. The language models 315, 317 may be different instances of the same type of language model (e.g., the same LLM) or can be different language models.

The question generator 301 obtains the database queries 207 generated as described above and generates abstracted representations of each database query ("abstracted database queries 313"). The abstracted database queries 313 are higher-level representations of the database queries 207 that are closer to natural language than the syntax of the database query language in which they are written. For instance, the question generator 301 can replace designated syntactic elements of each of the database queries 207 with a natural language equivalence or approximation, where the question generator 301 has been configured with mappings of syntactic elements to natural language text. For instance, the question generator 301 may map clauses of the database query language (e.g., SQL clauses) to corresponding words or phrases and replace each instance of these clauses in the database queries 207 with the corresponding word or phrase. To illustrate, the question generator may replace instances of the SQL "LIMIT" clause with "list of." The question generator 301 can label, tag, or otherwise associate identifiers with each database query 207 and respective one of the abstracted database queries 313 so that the database query represented by each of the abstracted database queries 313 can later be identified.

The question generator 301 generates prompts 305 based on the abstracted database queries 313 and a prompt template 307. The prompt template 307 comprises one or more task instructions to a language model to generate a question in natural language that corresponds to an abstracted database query (e.g., an abstracted SQL query) indicated in the prompt. The prompt template 307 also can indicate relationships between fields of the database for which the abstracted database queries 313 were generated. To illustrate, the prompt template 307 can comprise the following text: "You are a natural language question generation linguistic expert. User provides you with an abstracted SQL query. Your task is to generate a single natural language question corresponding to it. Assume that the generated question is being asked by a person who has no knowledge about the table schema. You are provided the relationships between fields, which should be used to rephrase semantically correct and succinct questions. Use the following instructions: Rephrase and summarize the question to be short. Always generate a single precise, concise, and succinct human like question."

The question generator 301 populates the prompt template 307 with each of the abstracted database queries 313 to generate the prompts 305. The question generator 301 submits the prompts 305 to the language model 315 and obtains responses 319 that comprise natural language questions 323 generated by the language model 315. The natural language questions 323 comprise natural language text that correspond to example questions that may be posed by users.

The filter 303 evaluates each pairing among the abstracted database queries 313 and the corresponding ones of the natural language questions 323. To ensure that each of the abstracted database queries 313 is accurately represented by the corresponding one of the natural language questions 323, the filter 303 prompts the language model 317 to evaluate pairs of the abstracted database queries 313 and the natural language questions 323 to determine if each natural language question is a meaningful question that asks for the same information as the corresponding abstracted database query. The filter 303 generates prompts 311 based on a prompt template 309 and the pairs of the abstracted database queries 313 and natural language questions 323. The prompt template 309 comprises one or more task instructions to a language model to determine if a question provided in the prompt corresponds to an abstracted database query also provided in the prompt. To guide the language model 317 in determining correspondence between natural language questions and abstracted database queries, the prompt template 309 may also comprise examples of abstracted database queries and natural language questions that do and do not correspond with reasoning for the verdict for chain-of-thought prompting. To illustrate, the prompt template 309 can include the following text:

"You are a paraphrasing expert. Your goal is to think step by step and check whether the question generated from text is the same or different. Slight variation while paraphrasing is okay unless it changes the semantic meaning of the text. The answer should only return one word, i.e., Same or Different."

An example pairing of an abstracted database query and natural language question that can be included in the prompt template 309 is the abstracted query, "Give me the most common apps WHERE files with 'conclusion' in name AND containing regex based data patterns" and the corresponding natural language question, "What are the top apps for asset names containing 'conclusion' with regex-based data patterns?" Another example is the abstracted database query, "What are 20 apps with oldest first modified date WHERE for file AND assets with 'out' in name AND asset size<4 KB" and the natural language question, "What are 20 apps with the earliest modification dates for files smaller than 4 KB with names containing 'out'?"

For each pairing between the abstracted database queries 313 and the natural language questions 323, the filter 303 inserts the abstracted database query and the natural language question into the prompt template 309 to form a respective one of the prompts 311. The filter 303 submits the prompts 311 to the language model 317 and obtains responses 321. Each of the responses 321 indicates whether a pair comprising one of the abstracted database queries 313 and a respective one of the natural language questions 323 correspond (e.g., are sufficiently similar/the same or are different). Each of the responses 321 can further indicate step-by-step reasoning by the language model 317 for the verdict as to whether an abstracted database query and natural language question correspond. The filter 303 determines based on the responses 321 which of the pairings between the natural language questions 323 and abstracted database queries 313 are the same or sufficiently similar. For these of the abstracted database queries 313 that are determined to be the same or sufficiently similar to respective ones of the natural language questions 323, the filter 303 identifies the respective ones of the database queries 207 (e.g., based on the identifiers associated therewith). The pairs between the database queries 207 that are identified and the corresponding natural language questions 323 are provided as the pairs 105 of database queries and natural language questions. The pairs 105 can be provided by inserting the pairs 105 into a database, writing the pairs 105 to a file, and/or generating a report comprising the pairs, as a few examples.

As described above and depicted in FIG. 3, the question generator 301 and the question filter 303 interface with different language models. While the question generator 301 and the filter 303 can interface with the same language model for generation of natural language questions and filtering of pairs of database queries and natural language questions, implementations will generally utilize different respective language models to prevent biases in responses caused by shared conversational memory.

FIGS. 4-8 are flowcharts of example operations. The example operations are described with reference to a database anonymizer and a database query-natural language question pair generation pipeline (hereinafter "the pipeline" for simplicity) for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 4:
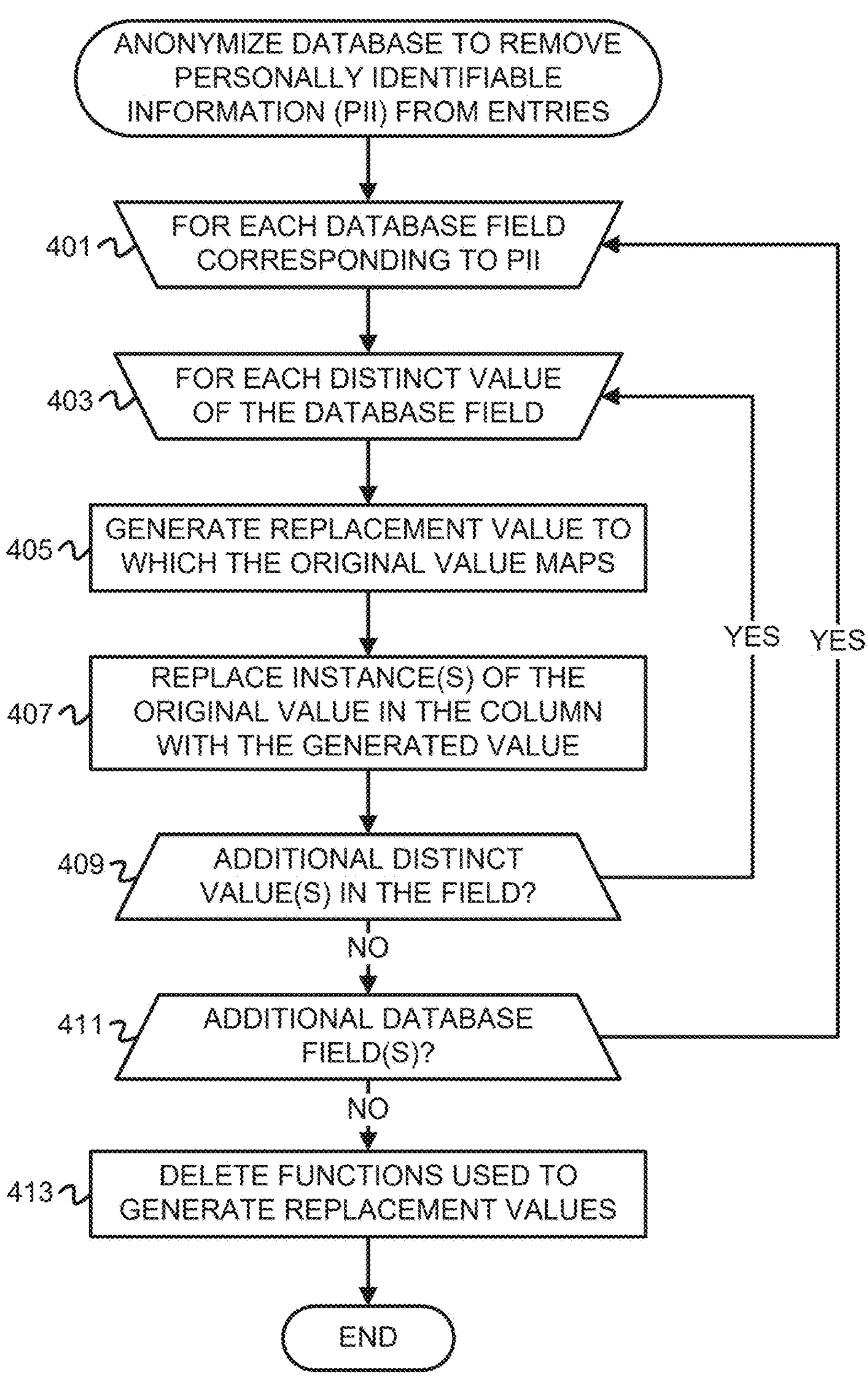
FIG. 4 is a flowchart of example operations for anonymizing a database to remove PII from entries.

FIG. 4 is a flowchart of example operations for anonymizing a database to remove PII from entries. The database may be a production database of an organization. Implementations may generate database queries that are compatible with a database that maintains sensitive information, such as a database managed by a cybersecurity provider. Since database query generation is partly based on a subset of entries of the database as described above by populating query templates with values retrieved from the database itself, it may thus be desirable to remove PII from the database before generating the database queries if the database includes sensitive or potentially sensitive information. Additionally, implementations can anonymize database entries that are randomly selected for database query generation rather than anonymizing the entirety of the database.

At block 401, the database anonymizer begins iterating over each field of the database identified as potentially storing PII. The database anonymizer has been configured with indications of the fields (e.g., database columns) for which values stored in the database can comprise PII, which has been predetermined (e.g., based on expert knowledge). Examples of PII to which database fields may correspond include IP addresses, usernames, and email addresses.

At block 403, the database anonymizer begins iterating over each distinct value in the database field. For instance, the database anonymizer can deduplicate the values stored in the database column to obtain the distinct values. The distinct value in the field is hereinafter referred to as the original value.

At block 405, the database anonymizer generates a replacement value to which the original value maps. The database anonymizer can generate replacement values based on types of the original values, and an indication of the type may be associated with the database field. Examples of value types include email addresses, numerical values, text strings, etc. The replacement values may be syntactically similar to the original values. Generating the replacement value can be based on applying a function to the original value, generating random characters of a same type(s) as the original value includes, etc. Since values may be repeated across fields, the replacement value may be determined based on a previous mapping (i.e., a mapping at a previous iteration for a different column). As another example, the same function or technique for replacement value generation can be used across fields since different fields can store values of the same type and may further include the same values.

At block 407, the database anonymizer replaces each instance of the original value in the field with the generated value. The database anonymizer inserts the generated value to overwrite each instance of the original value in the field.

At block 409, the database anonymizer determines if there are additional distinct values in the field. If so, operations continue at block 403. Otherwise, operations continue at block 411.

At block 411, the database anonymizer determines if there are additional fields corresponding to PII remaining. If so, operations continue at block 401. Otherwise, operations continue at block 413.

At block 413, the database anonymizer deletes the functions used to generate the replacement values. The database anonymizer deletes the functions by which the replacement values were computed/generated so that the mapping of original values to replacement values is not able to be reverse engineered, thus ensuring that the original values in the database corresponding to PII cannot be discerned based on the replacement values.

Implementations can further enrich the sampled entries of the anonymized database that are used for database query generation to reflect variation across values in the database as a whole. Since the subset of entries of the database that are sampled may not reflect all possible values for each database field, the pipeline can generate additional entries to account for the remaining possible values. This can be done for database fields that do not correspond to PII. To illustrate, a field of the database can have 100 distinct values stored in the database, though the sampled entries may only include 50 of these values for the field. The pipeline can generate 50 additional database entries in the sampled subset of entries that include the remaining 50 values (and other valid values for the other database fields) and/or can replace duplicate instances of a value in the existing sampled entries with one of the remaining possible values.

Figure 5:
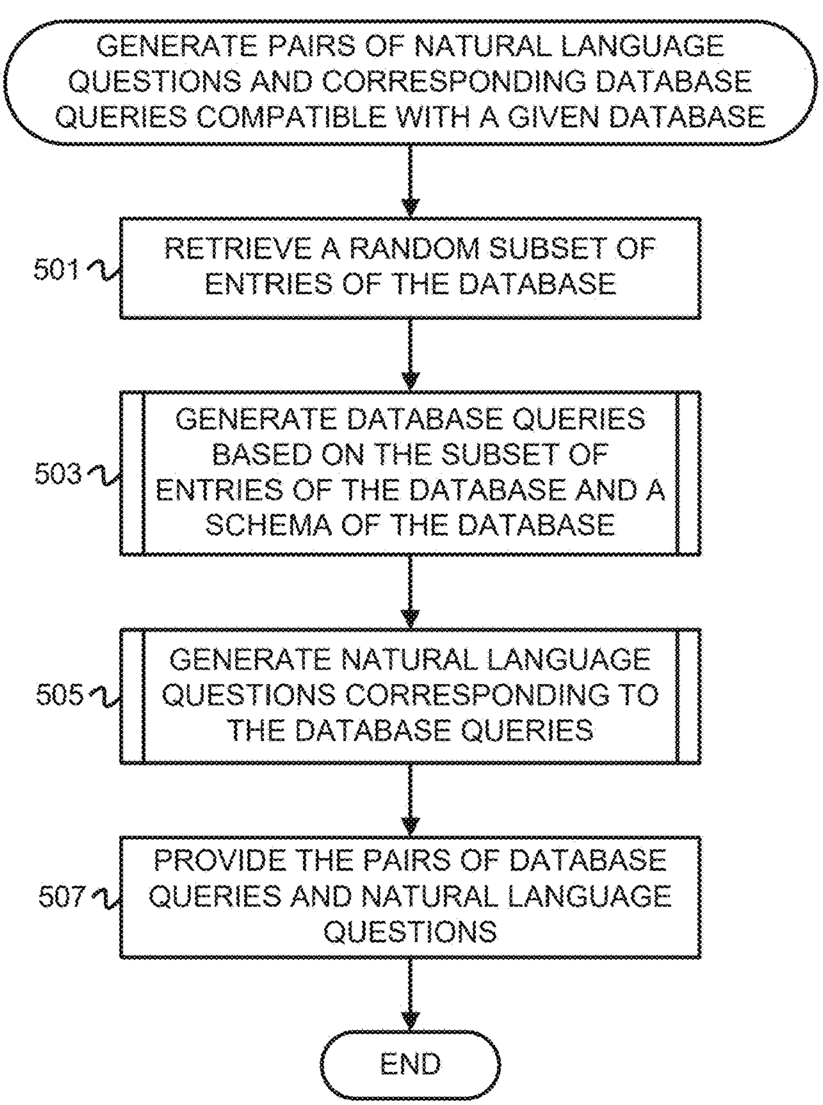
FIG. 5 is a flowchart of example operations for generating pairs of natural language questions and corresponding database queries compatible with a given database.

FIG. 5 is a flowchart of example operations for generating pairs of natural language questions and corresponding database queries compatible with a given database. The database may be a production database of an organization, and the database may have been anonymized to remove PII contained therein (e.g., as described in reference to FIG. 4).

At block 501, the pipeline retrieves a random subset of entries of the database. The pipeline queries the database for N random entries, where N is a preconfigured number. The number N has been tuned (e.g., based on expert knowledge) to ensure that a sizeable enough sample of entries is selected to allow for creation of a diverse set of database queries and corresponding natural language questions without incurring excessive cost in terms of latency and/or computing resources. As an illustrative example, the pipeline may retrieve 50 entries randomly selected from the database.

At block 503, the pipeline generates database queries based on the subset of entries of the database and a schema of the database. The database queries are in a database query language used for accessing the database, such as SQL. The pipeline generates database query templates based on the database schema and populates these database query templates with values identified from the subset of entries of the database to generate the database entries. Generation of database queries is described in further detail in reference to FIG. 6.

At block 505, the pipeline generates natural language questions corresponding to the database queries. The natural language questions can be considered example user queries that could be submitted by a user for retrieval of information from the database. The pipeline prompts a language model to generate questions in natural language corresponding to abstracted representations of each of the database queries. Generation of natural language questions that correspond to database queries is described in further detail in reference to FIG. 7.

At block 507, the pipeline provides the pairs of database queries and natural language questions. The pipeline can write the pairs of database queries and natural language questions to a database and/or a file, generate a report, etc. to make the database queries and natural language questions available, generally for the task of prompt engineering and/or foundation model tuning for text-to-database query conversion tasks (e.g., via a chatbot interface).

Figure 6:
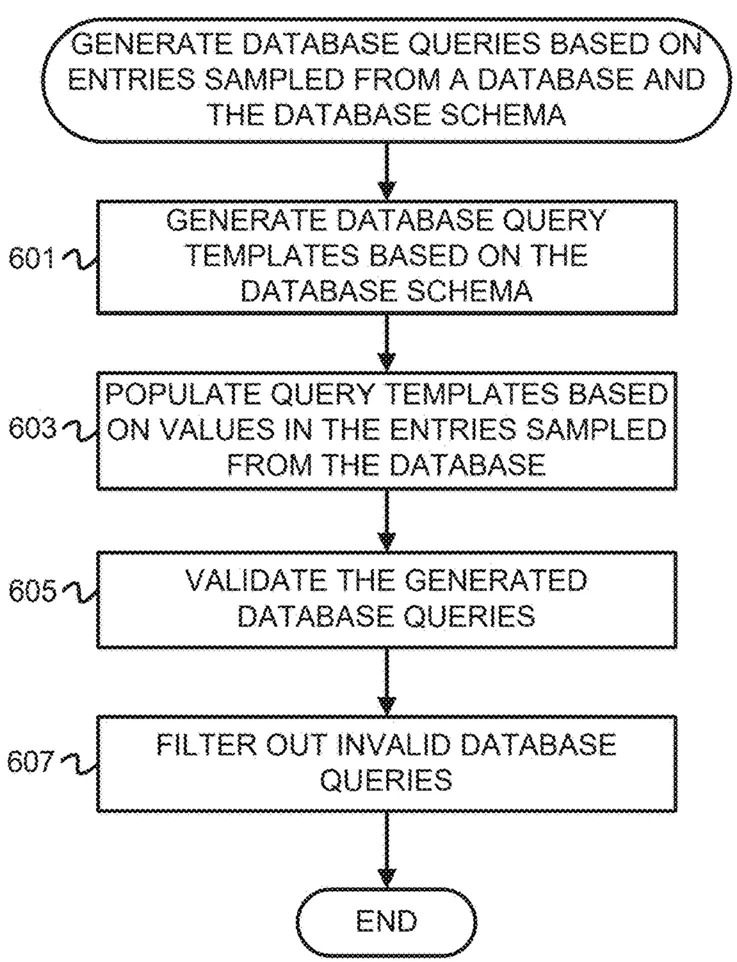
FIG. 6 is a flowchart of example operations for generating database queries based on entries sampled from a database and the database schema.

FIG. 6 is a flowchart of example operations for generating database queries based on entries sampled from a database and the database schema. The example operations assume that a random subset of entries of a database have been retrieved (e.g., via a SQL SELECT).

At block 601, the pipeline generates database query templates based on the database schema. Database query templates are database queries that include placeholder fields or parameters for values of one or more fields that can be inserted into the template to form a database query. The pipeline has been configured with or obtains (e.g., based on querying the database) the schema of the database. The database schema indicates valid database fields that can be included in database queries. The pipeline can be configured with a database query format and/or rules for database query template generation, such as indications of valid clauses in the database query language (e.g., SQL statements) and a rule that each clause should be used no more than once per database query template. Rules for database query template generation can further include rules defined by a cybersecurity vendor. These rules have been generated based on expert/domain knowledge based on evaluation of previously generated database query-natural language question pairs. These rules may be defined by domain experts to aid in filtering out templates for database queries that do not correspond to meaningful questions despite the potential for forming executable queries. For instance, a database query may be valid but can correspond to a natural language question that is highly unlikely to be asked by an end user, such as based on indicating highly unrelated database fields in a same database query. This can be reflected in a template generation rule.

Database query language statistics can also inform generation of the database query templates. As an example, the pipeline can be configured with statistics indicating a distribution of clauses/operation types (e.g., SQL clauses) in the database query language. The distribution can further comprise conditional probabilities that, given a particular clause, indicate likelihoods of subsequent clauses being the next clause in a database query of the database query language. The distribution may be determined based on expert knowledge and/or publicly available statistics. The pipeline can be preconfigured with a number N of query templates to generate. Database query template generation can also be based on database query difficulty or complexity ratings. Database query difficulty or complexity can be defined in terms of a number and/or type(s) of operations to be performed based on the clauses included therein. Including a variety of difficulty ratings for generated database query templates ensures variety in database queries that are used for subsequent model adaptation and/or prompt engineering.

At block 603, the pipeline populates the query templates based on values in the entries sampled from the database. The pipeline can populate each query template with values identified in one of the entries obtained from the database.

The pipeline may further generate multiple database query instances from a same database query template based on values identified in multiple corresponding database entries. The resulting database queries comport to the schema of the database and should produce non-empty results when executed against the database.

At block 605, the pipeline validates the generated database queries. The pipeline can perform a check to evaluate the query syntax for correctness. For instance, the pipeline can perform a dry run (e.g., with a dry run offered by the BigQuery® data warehouse) for each generated database query to verify that the syntax is correct and that the database query is executable. Database queries that include syntax errors or that cannot be executed are flagged as invalid.

At block 607, the pipeline filters out invalid database queries from the set of generated database queries. Those database queries that include syntax errors can also be filtered out of the set that is used for natural language question generation. The invalid database queries can be deleted, labeled or tagged to indicate that the database queries should not be used, etc. when filtered out from the set of valid database queries.

Figure 7:
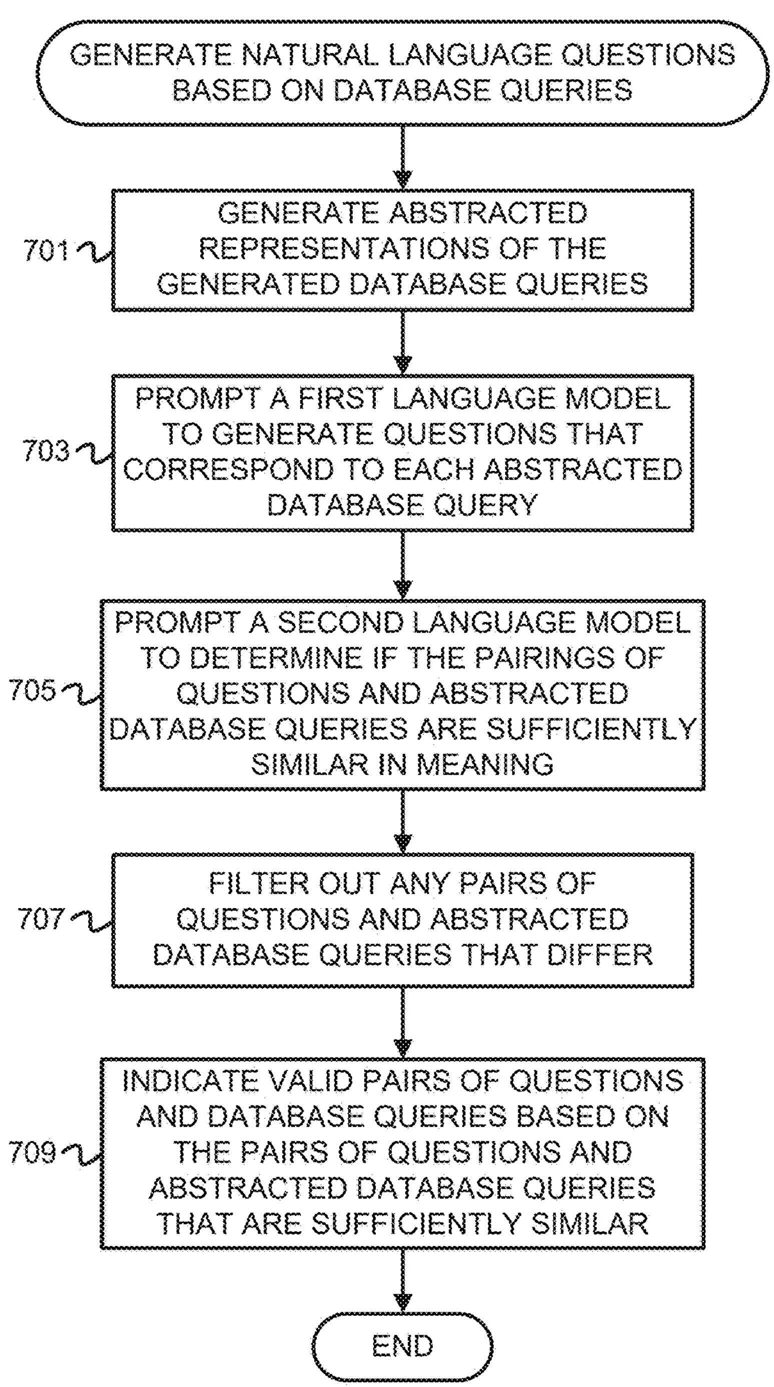
FIG. 7 is a flowchart of example operations for generating natural language questions based on database queries.

FIG. 7 is a flowchart of example operations for generating natural language questions based on database queries. The example operations assume that a plurality of valid database queries for a corresponding database have been generated as described above.

At block 701, the pipeline generates abstracted representations of the generated database queries. The pipeline can maintain mappings of clauses/statements and/or operation types in the database query language and corresponding natural language that indicates meaning of the clauses/statements and/or operation types. For each of the generated database queries, the pipeline replaces any clauses, statements, operation types, etc. that map to a natural language word(s) with the corresponding natural language word(s). The pipeline can associate (e.g., label, tag, etc.) identifiers with each of the database queries and corresponding abstracted representations thereof to facilitate identification of the database queries to which the abstracted representations correspond.

At block 703, the pipeline prompts a first language model to generate questions that correspond to each abstracted database query. The pipeline has been configured with a prompt template comprising a task instruction to generate a question that corresponds to an abstracted database query that is inserted into the template. The prompt template may also include examples of abstracted database queries and corresponding questions. For each abstracted database query, the pipeline inserts the abstracted database query into the prompt template and provides the resulting prompt to the first language model. The first language model may be an LLM, for instance. The pipeline obtains results of prompting the first language model that comprise generated questions for each abstracted database query.

At block 705, the pipeline prompts a second language model to determine if each of the pairings of questions and abstracted database queries are sufficiently similar in meaning. The second language model may be another instance of the LLM used as the first language model. The pipeline uses a separate LLM for the task of evaluating generated questions to avoid bias caused by conversational memory stored during question generation. The pipeline has been configured with a prompt template comprising a task instruction to evaluate an abstracted database query and a question comprising natural language text for similarity in meaning. The prompt template can also indicate examples of similar and/or different pairs of abstracted database queries and questions. To guide the second language model in evaluating similarity of abstracted database queries, the prompt template can also indicate reasoning for the pairs being similar or different for chain-of-thought prompting. The pipeline obtains results of prompting the second language model that comprise verdicts as to whether each of the pairs of abstracted database queries and questions are sufficiently similar or different.

At block 707, the pipeline filters out any pairs of questions and abstracted database queries that differ. The pipeline identifies pairs of questions and abstracted database queries in the results associated with a "different" verdict by the second language model. The pipeline can discard these pairs, label or tag the pairs to indicate they should be omitted from further processing, etc.

At block 709, the pipeline indicates valid pairs of questions and database queries based on the pairs of questions and abstracted database queries that were determined to be sufficiently similar. The pipeline matches each generated question to the corresponding database query for which the associated abstraction was generated. This may be based on identifiers that were associated with each database query and corresponding abstraction.

Figure 8:
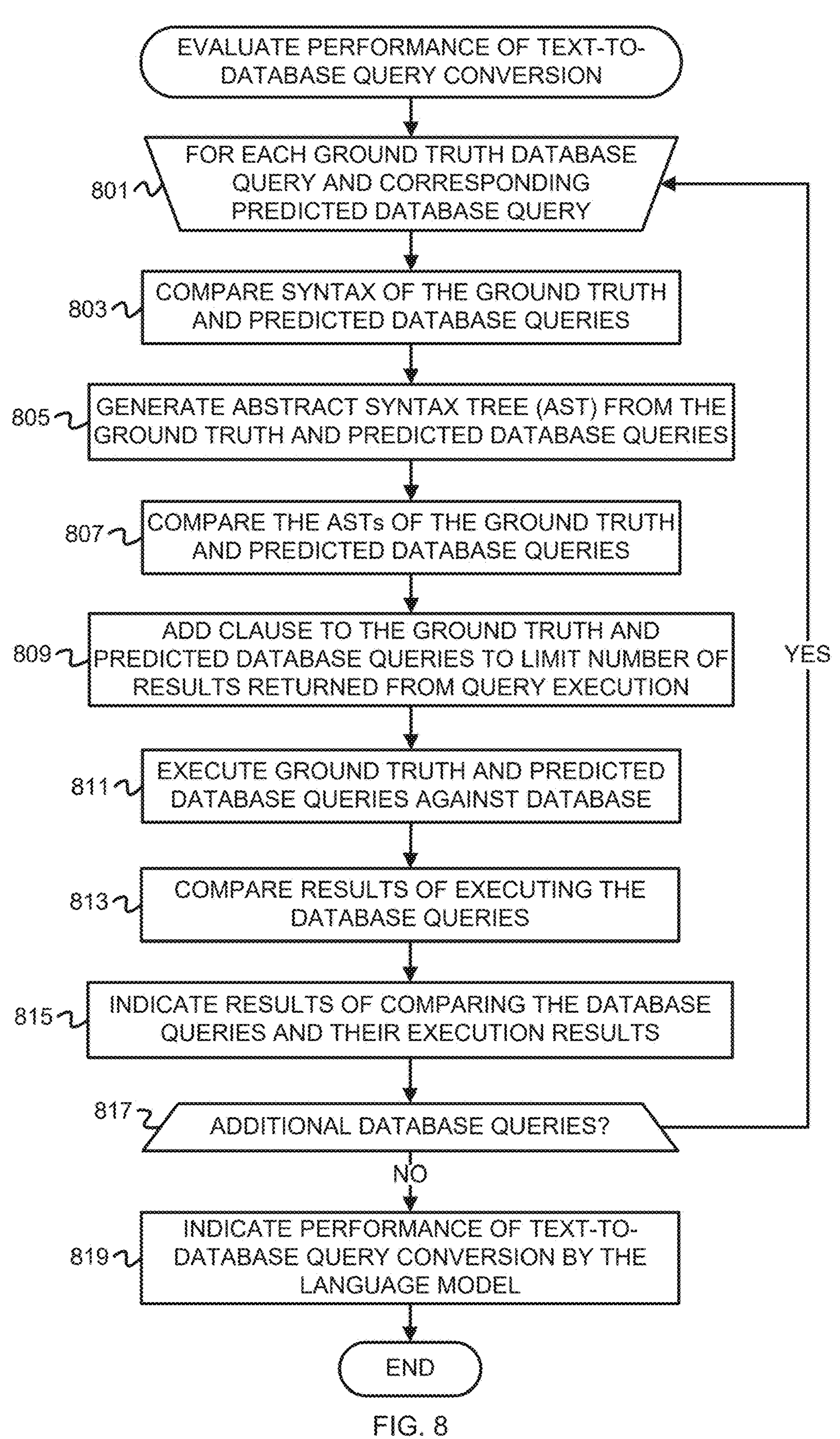
FIG. 8 is a flowchart of example operations for evaluating performance of text-to-database query conversion operations.

FIG. 8 is a flowchart of example operations for evaluating performance of text-to-database query conversion operations. Evaluating performance of text-to-database query conversion uses the generated natural language question and database query pairs as a ground truth. The example operations assume that a foundation model (e.g., an LLM) has generated a plurality of database queries based on questions comprising natural language text that were provided to the foundation model, where the natural language text is the same as the natural language questions corresponding to the ground truth database queries. These database queries differ from those described above because they have been generated in a deployment environment based on input of questions to the foundation model, such as via a chatbot interface. A prompt may have been engineered for text-to-database query conversion based on the pairs of database queries and natural language questions generated as described above.

At block 801, the pipeline begins iterating over each ground truth database query and corresponding predicted database query. The predicted database queries are generated from the same natural language questions as those corresponding to the ground truth database queries. To differentiate between database queries, the database queries generated as described above are referred to as the "ground truth" database queries, and those generated based on prompting the foundation model are referred to as the "predicted" database queries.

At block 803, the pipeline compares syntax of the ground truth database query and the predicted database query. The pipeline determines if the ground truth and database queries have identical syntax. Comparing syntax can include determining if the ground truth and predicted database queries are an exact match.

At block 805, the pipeline generates an abstract syntax tree (AST) for each of the ground truth and predicted database queries. The pipeline may utilize a library for AST generation, such as an off-the-shelf/open-source library for SQL processing.

At block 807, the pipeline compares the ASTs of the ground truth and predicted database queries. The pipeline may utilize a library for AST processing, such as a SQL processing library, to evaluate the ASTs and compare the nodes of each AST based on traversal of each AST. Comparing nodes includes checking the structure of the ASTs as well as comparing values included in the nodes of the ASTs. For instance, ground truth and predicted database queries identified to have different values for a LIMIT statement or similar in their respective ASTs will be considered to be different.

At block 809, the pipeline adds a clause to limit a number of returned results of executing the ground truth and predicted database queries. If the pipeline determined as a result of previous comparisons that the ground truth and predicted database queries have different values of such a clause that limits the number of returned results, the pipeline can omit this operation since the ground truth and predicted database queries will be considered different. Otherwise, the pipeline appends a clause to each of the ground truth and predicted database queries that limits the number of results returned as a result of executing the database queries (e.g., a SQL LIMIT statement) to reduce cost and time of execution of the database queries during evaluation operations. The appended clause indicates a designated number of results to return (e.g., the first 50 results). The pipeline can also add clauses to group and/or order results (e.g., ORDER BY and GROUP BY statements) in the ground truth and predicted database queries to prevent ambiguous outcomes in cases of tied database results.

At block 811, the pipeline executes the ground truth and predicted database queries against the database. The pipeline submits the ground truth database query and the predicted database query to the database to obtain corresponding results, which have been limited by the clause appended at block 809.

At block 813, the pipeline compares results of executing the ground truth and predicted database queries. The ground truth database query should be executable, though the predicted database query may have timed out or not been properly executable (e.g., due to a syntax error, referencing a nonexistent database field, etc.), which is indicated by the execution results. The pipeline may determine that the results are different in content or different in ordering. Differences in ordering of results is generally treated as acceptable and not reflective of substantial differences in the database queries (unless the ground truth database query specified an order for results, such as ascending or descending order), while differences in content are indicative of substantial differences between the ground truth and predicted database queries that may reflect poor performance of the language model that performs text-to-database query conversion. The pipeline can assign a score or rating to the execution results that indicate whether the execution results are the same, the predicted database query was not executable or timed out, whether the execution results are the same with a different ordering, etc.

At block 815, the pipeline indicates results of comparing the database queries and their execution results. The results of the comparison are indicative of performance of text-to-database query conversion. The pipeline can generate a notification or report indicating the result of the comparisons and/or the results of executing the ground truth and predicted database queries, add the result of the comparisons and/or the results of executing each of the ground truth and predicted database queries to a notification or report, etc.

At block 817, the pipeline determines if there are additional ground truth and predicted database queries remaining for evaluation. If so, operations continue at block 801. Otherwise, operations continue at block 819.

At block 819, the pipeline indicates performance of text-to-database query conversion by the language model. The pipeline can indicate (e.g., display and/or store in a database) the notification or report indicating the results of the comparisons and/or the results of executing each of the ground truth and predicted database queries. The pipeline may also determine a score representing performance of the language model based on the results of comparing the ground truth and predicted database queries and their execution results, such as based on results of syntax/AST-based evaluation across database query pairs and based on the comparison of execution results (e.g., by aggregating/averaging scores assigned across ground truth and predicted database query pairs).

Implementations can cache results of executing ground truth and/or predicted database queries in association with the corresponding database query. To further reduce cost associated with evaluating execution of database queries, the pipeline may search the cache for a database query being executed (whether ground truth or predicted) to determine if a matching query has already been executed and the results cached. If the search results in a cache hit, the pipeline can use the query results obtained from the cache for the comparison at block 813 rather than repeating execution of the database query.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For instance, with reference to FIG. 8, the example operations can be performed in parallel or concurrently across pairs of database queries. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 9:
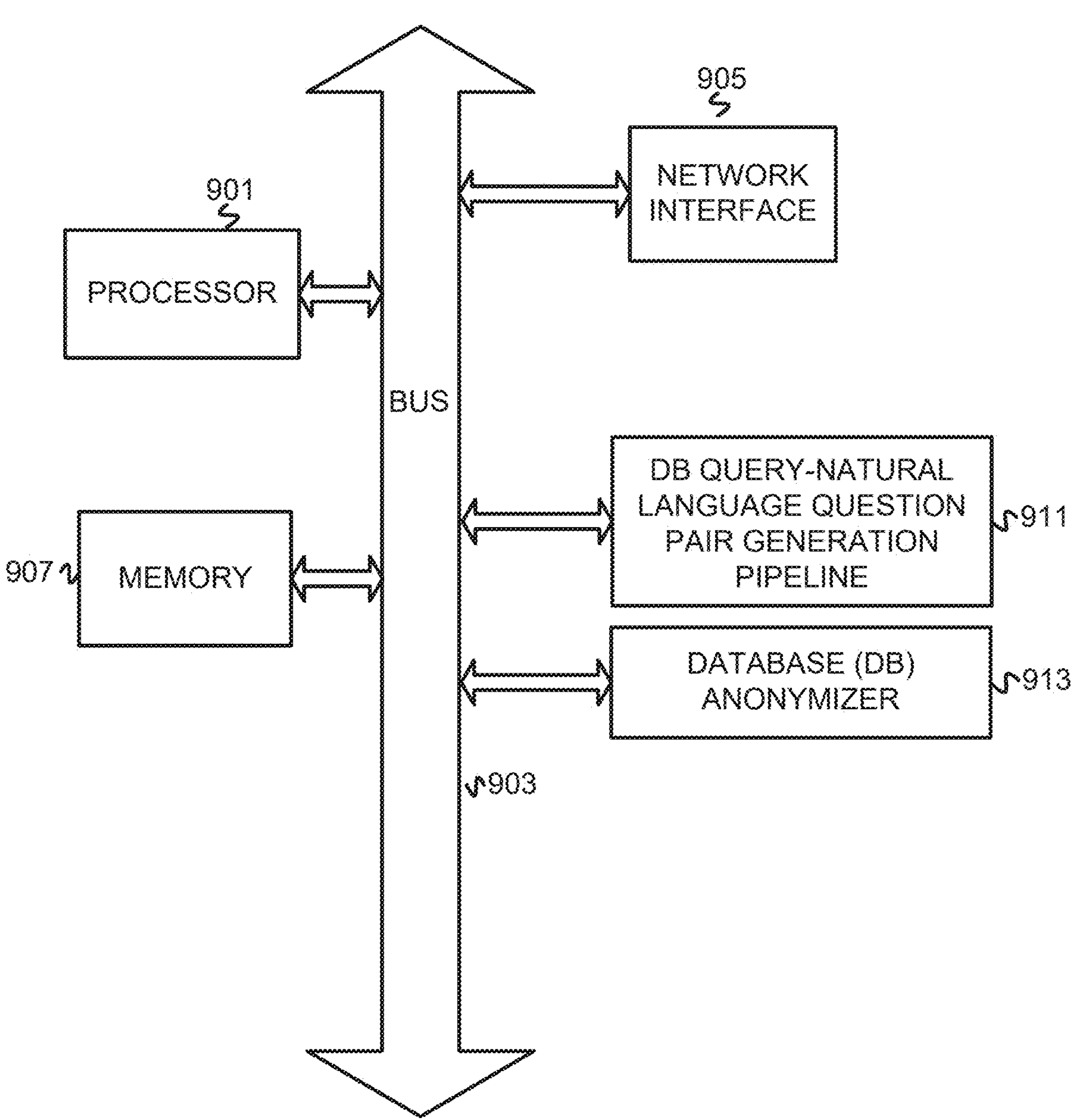
FIG. 9 depicts an example computer system with a database query-natural language question pair generation pipeline and a database anonymizer.

FIG. 9 depicts an example computer system with a database query-natural language question pair generation pipeline and a database anonymizer. The computer system includes a processor 901 (possibly including multiple processors, multiple cores, multiple nodes, and/or implementing multi-threading, etc.). The computer system includes memory 907. The memory 907 may be system memory or any one or more of the above already described possible realizations of machine-readable media. The computer system also includes a bus 903 and a network interface 905. The system also includes database query-natural language question pair generation pipeline ("the pipeline") 911 and database anonymizer 913. The pipeline 911 generates pairs of database queries and questions comprising natural language text that are example user queries. The database anonymizer 913 anonymizes a database by replacing PII included in database entries with values that it generates. The pipeline 911 can comprise a plurality of components that do not necessarily execute as part of the same computer system. Additionally, while depicted as part of the same computer system in FIG. 9, the pipeline 911 and the database anonymizer 913 also do not necessarily execute as part of the same computer system. Any one of the previously described functionalities may be partially (or entirely) implemented in hardware and/or on the processor 901. For example, the functionality may be implemented with an application specific integrated circuit, in logic implemented in the processor 901, in a co-processor on a peripheral device or card, etc. Further, realizations may include fewer or additional components not illustrated in FIG. 9 (e.g., video cards, audio cards, additional network interfaces, peripheral devices, etc.). The processor 901 and the network interface 905 are coupled to the bus 903. Although illustrated as being coupled to the bus 903, the memory 907 may be coupled to the processor 901.

The invention claimed is:

1. A method comprising:

generating a plurality of database query templates based on first rules for generating database query templates and schema information of a database;

populating the plurality of database query templates with values determined based on a subset of records of the database to generate a plurality of database queries;

abstracting the plurality of database queries to generate a plurality of abstracted database queries, wherein the plurality of abstracted database queries are higher-level representations of the plurality of database queries that are closer to natural language than syntax of the plurality of database queries;

generating a plurality of natural language questions that correspond to the plurality of abstracted database queries, wherein generating the plurality of natural language questions comprises, for each of the plurality of abstracted database queries, prompting a first language model with a prompt comprising an instruction to generate a question in natural language that corresponds to the abstracted database query; and providing a plurality of database query-natural language question pairs, wherein each of the plurality of database query-natural language question pairs comprises a corresponding one of the plurality of database queries and a corresponding one of the plurality of natural language questions.

2. The method of claim 1, wherein generating the plurality of natural language questions comprises, for each database query of the plurality of database queries, determining if the question generated by the first language model is valid, wherein the plurality of natural language questions comprise questions generated by the first language model that were determined to be valid.

3. The method of claim 2, wherein determining if the question generated by the first language model is valid comprises prompting a second language model with a prompt comprising an instruction to determine if the abstracted database query and the question generated by the first language model are sufficiently similar.

4. The method of claim 3, wherein prompting the second language model comprises prompting the second language model with chain-of-thought prompting.

5. The method of claim 1, further comprising determining if each of the plurality of database queries is valid based, at least in part, on at least one of evaluating syntax of each of the plurality of database queries and performing a dry run of each of the plurality of database queries.

6. The method of claim 1, wherein the first rules for generating database query templates were determined based on evaluation of a previously generated set of database query-natural language question pairs.

7. The method of claim 1, further comprising anonymizing the database to remove personally identifiable information (PII) in the database before generating the plurality of database query templates, wherein the subset of records of the database has been anonymized.

8. The method of claim 7, wherein anonymizing the database comprises, determining one or more columns of the database that correspond to PII; and for each of the one or more columns, for each unique value stored in a row within the column, mapping the unique value to a second value that is unique with respect to values within the column; and replacing instances of the unique value within the column with the second value.

9. The method of claim 1, further comprising:

obtaining one or more database queries generated by a language model, wherein the language model was prompted to generate each of the one or more database queries based, at least in part, on a subset of the plurality of database query-natural language question pairs; and evaluating quality of the one or more database queries generated by the language model based on one or more of the plurality of database queries generated from the subset of query templates.

10. The method of claim 1, wherein the plurality of database query templates comprise a plurality of Structured Query Language (SQL) templates, and wherein the plurality of database queries comprise a plurality of SQL queries.

11. One or more non-transitory machine-readable media having program code stored thereon, the program code comprising instructions to:

generate a plurality of query templates for a query language of a database based, at least in part, on schema information of the database;

generate a plurality of database queries based on the subset plurality of query templates, wherein the instructions to generate the plurality of database queries comprise instructions to populate the plurality of query templates with values determined based on a subset of records of the database;

determine whether the plurality of database queries is valid;

based on a determination that at least a subset of the plurality of database queries is valid, abstract the subset of database queries determined to be valid, wherein instructions to abstract the subset of database queries comprise instructions to generate a plurality of abstracted database queries, wherein the plurality of abstracted database queries are higher-level representations of the subset pf database queries that are closer to natural language than syntax of the subset of database queries;

generate a plurality of example user queries that correspond to the subset of database queries, wherein each of the plurality of example user queries comprises natural language text, wherein the instructions to generate the plurality of example user queries comprise instructions to, for each of the plurality of abstracted database queries, prompt a first language model with a prompt comprising an instruction to generate a query comprising natural language text that corresponds to the abstracted database query; and indicate a plurality of pairs of database queries and example user queries, wherein each of the plurality of pairs comprises a corresponding one of the subset of database queries and a corresponding one of the plurality of example user queries.

12. The non-transitory machine-readable media of claim 11, wherein the instructions to generate the plurality of example user queries comprise instructions to, for each database query of the subset of database queries, determine whether the query comprising natural language text generated by the first language model is valid, wherein the plurality of example user queries comprise queries comprising natural language text generated by the first language model that were determined to be valid.

13. The non-transitory machine-readable media of claim 11, wherein the instructions to generate the plurality of query templates for the query language of the database further comprise instructions to generate the plurality of query templates based, at least in part, on a plurality of rules, wherein the plurality of rules was defined based on prior evaluation of valid pairs of example user queries and database queries.

14. The non-transitory machine-readable media of claim 11, wherein the program code further comprises instructions to remove personally identifiable information (PII) from records maintained in the database before generation of the plurality of query templates, wherein the instructions to remove the PII from the records comprise instructions to, determine one or more columns of the database that correspond to PII; and for each of the one or more columns, for each unique value stored in a row within the column, map the unique value to a second value that is unique with respect to other values within the column; and replace instances of the unique value within the column with the second value.

15. An apparatus comprising:

a processor; and a machine-readable medium having instructions stored thereon that are executable by the processor to cause the apparatus to, sample a subset of records of a database;

generate a plurality of database query templates based on a plurality of rules and schema information of the database;

populate the plurality of database query templates with values determined based on a subset of records of the database to generate a plurality of database queries;

determine that at least a subset of the plurality of database queries is valid;

generate a plurality of natural language questions that corresponds to the subset of the plurality of database queries, wherein the instructions to generate the plurality of natural language questions comprise instructions to, for each database query in the subset of the plurality of database queries, generate an abstracted representation of the database query; and prompt a first language model with a prompt comprising an instruction to generate a question in natural language that corresponds to the abstracted representation of the database query, wherein the abstracted representation of the database query is a higher-level representation of the database query that is closer to natural language than syntax of the database query:

indicate a plurality of pairs of database queries and natural language questions, wherein each of the plurality of pairs comprises a corresponding one of the plurality of database queries and a corresponding one of the plurality of natural language questions.

16. The apparatus of claim 15, wherein the instructions executable by the processor to cause the apparatus to determine that at least a subset of the plurality of database queries is valid comprise instructions executable by the processor to cause the apparatus to determine if each of the plurality of database queries is valid based, at least in part, on at least one of evaluating syntax of the database query and performing a dry run of the database query.

17. The apparatus of claim 15, wherein the instructions executable by the processor to cause the apparatus to generate the plurality of natural language questions comprise instructions executable by the processor to cause the apparatus to, for each database query of the plurality of database queries, determine if the question generated by the first language model is valid, wherein the plurality of natural language questions comprise questions generated by the first language model that were determined to be valid.

18. The apparatus of claim 17, wherein the instructions executable by the processor to cause the apparatus to determine if the question generated by the first language model is valid comprise instructions executable by the processor to cause the apparatus to prompt a second language model with a prompt comprising an instruction to determine if the abstracted representation of the database query and the question generated by the first language model are sufficiently similar.

19. The apparatus of claim 15, further comprising instructions executable by the processor to cause the apparatus to anonymize the database to remove personally identifiable information (PII) in the database before generation of the plurality of database query templates, wherein the subset of records of the database has been anonymized.

20. The apparatus of claim 15, wherein the instructions executable by the processor to cause the apparatus to generate the plurality of database query templates comprise instructions executable by the processor to cause the apparatus to generate a plurality of Structured Query Language (SQL) templates, wherein the instructions executable by the processor to cause the apparatus to generate the plurality of database queries comprise instructions executable by the processor to cause the apparatus to generate a plurality of SQL queries.

* * * * *